United States Patent

[11] 3,627,785

[72] Inventors: Janos Zergenyi, Riehen; Ernst Habicht, Oberwil, both of Switzerland
[21] Appl. No.: 839,631
[22] Filed: July 7, 1969
[45] Patented: Dec. 14, 1971
[73] Assignee: Geigy Chemical Corporation, Ardsley, N.Y.
[32] Priority: July 22, 1968
[33] Switzerland
[31] 10967/68

[54] BENZOFURAN-2-CARBOXYLIC ACIDS
4 Claims, No Drawings
[52] U.S. Cl. .................................................... 260/346.2, 424/255
[51] Int. Cl. ..................................................... C07d 5/42

[50] Field of Search ............................................ 260/346.2 R

[56] References Cited
OTHER REFERENCES
Gilman et al. Chem. Abstr. (1940) Vol. 34 pp. 2366

Primary Examiner—Alex Mazel
Assistant Examiner—Bernard I. Dentz
Attorneys—Karl F. Jorda and Bruce M. Collins ABSTRACT: Compounds of the class of 4-(2-methylene-alkoyl-2-carboxylic acids and the pharmaceutically acceptable salts thereof with bases have diuretic and saluretic effects in mammals; pharmaceutical compositions comprising said compounds and a pharmaceutical carrier, and methods of producing a diuretic and saluretic effect in mammals are provided; a typical embodiment is 6-methyl-4-(2-methylene-butyryl)-benzofuran-2-carboxylic acid.

BENZOFURAN-2-CARBOXYLIC ACIDS

DETAILED DISCLOSURE

The invention concerns benzofuran-2-carboxylic acids, processes for the production thereof, pharmaceutical compositions containing the compounds and the use thereof.

More particular, the invention pertains to compounds of the formula

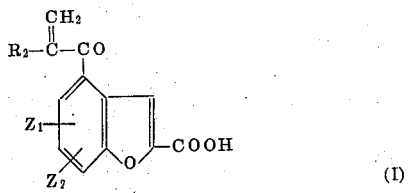

wherein
  $R_2$ is alkyl having at most three carbon atoms; and
  $Z_1$ and $Z_2$ independently of each other are hydrogen, methyl, ethyl, methoxy or ethoxy; and
  the pharmaceutically acceptable salts thereof with bases.

A preferred subclass are compounds of formula I wherein R is ethyl, and the pharmaceutically acceptable salts thereof with bases.

Preferred members are
  6-methyl-4-(2-methylene-butyryl)-benzofuran-2-carboxylic acid, and
  6,7-dimethyl-4-(2-methylene-butyryl)-benzofuran-2-carboxylic acid,
and the pharmaceutically acceptable salts thereof with bases.

The invention pertains also to pharmaceutical compositions comprising a compound of formula I and/or a pharmaceutically acceptable salt thereof with bases and a pharmaceutical carrier therefor.

Furthermore, the invention pertains to a method of producing diuresis and saluresis in mammals which method comprises administering to said mammal an effective amount of a compound of formula I or of a pharmaceutically acceptable salt thereof with a base.

In the benzofuran-2-carboxylic acids of formula I, $Z_1$ occupies the 5- or 6-position and $Z_2$ the 6- or 7-position. As lower alkyl having at most three carbon atoms, R is methyl, ethyl, propyl or isopropyl.

Compounds of formula I are produced, according to the invention, by decomposing a compound of formula II

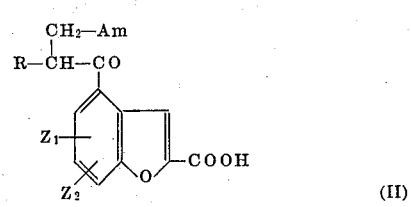

wherein
  R, $Z_1$ and $Z_2$ have the meaning given under formula I, and
  Am is the radical of a secondary organic base, with the thereby-occurring splitting off of an amine of formula III
  H—Am (III)
wherein
  Am has the meaning given under formula II and, optionally, converting the reaction product into a salt with an inorganic or organic base.

A compound of formula II is preferably decomposed by heating in the presence of a weak base in a solvent containing hydroxyl groups. Suitable weak bases are, e.g. sodium acetate or sodium hydrogen carbonate; they are preferably used in glacial acetic acid or water.

As starting materials of formula II, such materials are used for example, which correspond to the more restricted formula IIa

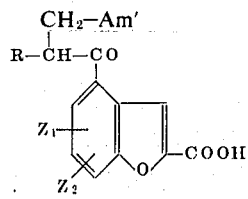

wherein
  Am' is lower dialkylamino such as dimethylamino or diethylamino, 1-pyrrolidinyl, piperidino, hexahydro-1H-1-azepinyl or morpholino and
  R, $Z_1$ and $Z_2$ have the meanings given under formula I.

Suitable starting materials of formulas II and IIa are e.g. compounds whose substituents R, $Z_1$ and $Z_2$ conform to the groups listed under formula I. These starting materials can, for example, be produced from carboxylic acids of formula IV

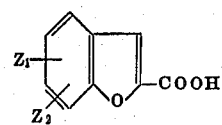

wherein
  $Z_1$ and $Z_2$ have the meanings given under formula I.

These (V) are condensed according to the Friedel-Crafts reaction, using aluminum chloride in nitrobenzene, with carboxylic acid chlorides of formula V, $$R—CH_2—COCl \quad (V)$$

wherein
  R has the meaning given under formula I, to give the corresponding 4-alkanoyl derivatives. Such alkanoyl derivatives are, e.g. the 4-acetyl-, 4-propionyl-, 4-butyryl-, 4-valeryl- or 4-isovaleryl derivatives of the benzofuran-2-carboxylic acid, which are optionally substituted by the substituents $Z_1$ and/or $Z_2$ in 5- or 6-position or 6- or 7-position. The stated 4-alkanoyl derivatives are subsequently converted, with the aid of formaldehyde or paraformaldehyde and a secondary organic base, into the corresponding Mannich compounds of formulas II or IIa.

Suitable carboxylic acids of formula IV are, e.g. compounds having radicals $Z_1$ and $Z_2$ which conform to the groups listed under formula I. Such like compounds are described in he literature, e.g. the benzofuran-2-carboxylic acid [cp. R. Fitting et al. Ann. Chem. 216, 162 (1883)], the 5-methyl-benzofuran-2-carboxylic acid [cp. R. Andrisano and G. Pappalario, Gazz. chim.ital. 83, 108 (1953)], the 6-methyl-benzofuran-2-carboxylic acid [cp. K. von Auwers, Ann. Chem. 408, 255 (1915)], the 7-methoxy-benzofuran-2-carboxylic acid [cp. R. Andrisano et al., Boll.sci.fac.chim.ind. 14, 96 (1956)] and the 5-methoxy-benzofuran-2-carboxylic acid [cp. S. Tanaka J.Am.Chem.Soc.73, 872 (1951)]. Other compounds of this type can be produced analogously.

For the preparation of pharmaceutically acceptable salts can be used inorganic and organic bases, such as alkali or alkaline earth hydroxides, carbonates or bicarbonates. Suitable are thus e.g. sodium, potassium, magnesium and calcium hydroxides, carbonates or bicarbonates, as well as triethanolamine and choline. Such salts are produced via conventional methods, e.g. by mixing a compound of formula I with the equivalent amount of the desired base in a suitable solvent such as water, mixture of water with an organic solvent or in organic solvents alone such as methanol, ethanol, or propanol and isolating the salts formed in a conventional manner.

The compounds of the invention have been found to have valuable pharmacological properties. In particular, they have a diuretic and simultaneously saluretic action in combination with a low order of toxicity. The excretion of potassium in proportion to sodium is very favorable. These properties characterize the compounds as being suitable for the treatment of disturbances caused by insufficient excretion of urine and electrolytes, especially of sodium chloride. Such disturbances are the cause of edema and hypertension.

The diuretic and saluretic effects of the compounds of the invention are illustratively demonstrated in experimental animals. Thus it can be shown by conventional pharmacological experiments that 6-methyl-4-(2-methylene-butyryl)-benzofuran-2-carboxylic acid and 6,7-dimethyl-4-(2-methylene-butyryl)-benzofuran-2-carboxylic acid on peroral administration of about 5 mg./kg. to dogs significantly increase the excretion of urine and simultaneously of sodium chloride.

The carboxylic acids of formula I, and the pharmaceutically acceptable salts thereof, are preferably administered orally. The doses depend on the species, the age and weight of the subject under treatment as well as on the particular condition to be treated. In general, the daily dosages vary between 1 and 20 mg./kg. for mammals. Suitable dosage units such as dragées or tablets, preferably contain as active substance 25 to 500 mg. of a benzofuran-2-carboxylic acid of formula I, or of a pharmaceutically acceptable salt thereof. The proportion of active substance is preferably 20 to 80 percent in the stated dosage units. Dosage units for oral administration are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragée cores. The latter are coated, e.g. with concentrated sugar solutions which can also contain e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

The following examples further illustrate the production of compounds of formula I and of hitherto-undescribed intermediate products as well as the production of pharmaceutical compositions, but they are by no means the sole methods of producing same. Temperatures are given in degrees centigrade.

EXAMPLE 1 a. 2.0 g. of 6-methyl-4-butyryl-benzofuran-2-carboxylic acid with 0.41 g. of paraformaldehyde and 0.82 g. of dimethylamine hydrochloride are slurried in 20 ml. of dioxane and the whole is refluxed for 6 hours while stirring. The dioxane is then distilled off under normal pressure. To the residue, i.e. the crude 6-methyl-4-[2-(dimethylaminomethyl)-butyryl]-benzofuran-2-carboxylic acid hydrochloride, are added 20 ml. of glacial acetic acid and 2.0 g. of sodium acetate and the mixture is refluxed for 2 hours. The glacial acetic acid is then evaporated off in vacuo, the residue taken up in 50 ml. of water and the mixture acidified with concentrated hydrochloric acid to obtain pH 2–3. The acid-aqueous suspension is stirred for half an hour at room temperature, the precipitated crystals are then filtered with suction, dried in vacuo at 60° and recrystallized from benzene/ethyl acetate. The obtained 6-methyl-4-(2-methylene-butyryl)-benzofuran-2-carboxylic acid melts at 168°–169°.

The 6-methyl-4-butyryl-benzofuran-2-carboxylic acid, used as starting material, is produced as follows:

b. 10.0 g. of 6-methyl-benzofuran-2-carboxylic acid [cp. K. von Auwers, Ann.Chem. 408, 255 (1915)] are suspended in 30 ml. of nitrobenzene. 28.0 g. of aluminum chloride are added in portions to the suspension, while cooling with ice, so that a reaction temperature of 10° is maintained. 9.0 g. of butyryl chloride are then added dropwise within 30 minutes at the same temperature. The mixture is subsequently stirred for 24 hours at 25°, then poured onto 300 g. of ice and 50 ml. of concentrated hydrochloric acid and the acid-aqueous suspension extracted twice using 300 ml. of ether each time. The combined ether solutions are washed with water and extracted twice using 100 ml. of saturated sodium hydrogen carbonate solution each time. The sodium hydrogen carbonate extract is adjusted to pH 2–3 with concentrated hydrochloric acid and the obtained suspension stirred for 1 hour at room temperature. The precipitated crystals are filtered with suction, washed with water and dissolved in ethyl acetate. The ethyl acetate solution is dried with anhydrous magnesium sulfate and concentrated by evaporation in vacuo, By means of fractional recrystallization of the residue from ethyl acetate/dioxane is obtained, in addition to the 6-methyl-5-butyryl-benzofuran-2-carboxylic acid, the 6-methyl-4-butyryl-benzofuran-2-carboxylic acid, m.p. 211°–212° (from ethyl acetate/dioxane).

EXAMPLE 2 a. From 2.5 g. of 5-methyl-4-butyryl-benzofuran-2-carboxylic acid with 0.6 g. of paraformaldehyde and 1.2 g. of dimethylamine hydrochloride is obtained, analogously to example 1(a), the crude 5-methyl-4-[2-(dimethylaminomethyl)-butyryl]-benzofuran-2-carboxylic acid hydrochloride, which is converted with 3.0 g. of sodium acetate and 30 ml. of glacial acetic acid into the 5-methyl-4-(2-methylene-butyryl)-benzofuran-2-carboxylic acid, m.p. 165°–166° (from ethyl acetate).

The starting compound, i.e. the 5-methyl-4-butyryl-benzofuran-2-carboxylic acid, is produced as follows:

b. 26.3 g. of 5-methyl-benzofuran-2-carboxylic acid [cp. R. Andrisano and G. Pappalario, Gazz. chim.ital. 83, 108 (1953)] are suspended in 100 ml. of nitrobenzene and cooled to 0°. To this suspension are added 70.0 g. of pulverized aluminum chloride in portions, so that the reaction temperature does not exceed 10°. 20.0 g. of butyryl chloride are then added dropwise at the same temperature. The reaction mixture is stirred for 64 hours at room temperature and then for 6 hours 60°. The reaction mixture is then poured onto a mixture of 400 g. of ice and 100 ml. of concentrated hydrochloric acid. The acid-aqueous suspension is extracted twice using 250 ml. of ether each time, the ether extract washed with 200 ml. of water and then extracted twice with 100 ml. of concentrated sodium hydrogen carbonate solution each time. The combined sodium hydrogen carbonate solutions are adjusted with concentrated hydrochloric acid to pH 2–3. The obtained suspension is then extracted twice using 200 ml. of ether each time. After washing with water, the ether phase is dried with sodium sulfate and concentrated by evaporation. The residue can be separated into two fractions by elution chromatography on a column of 500 g. of silica gel with the eluting agent benzene/ether/glacial acetic acid (95:4:1). THe first fraction contains the 4-butyryl-5-methyl-benzofuran-2-carboxylic acid, m.p. 143°–146° (from ethyl acetate).

EXAMPLE 3

From 3.0 g. of 7-methoxy-4-butyryl-benzofuran-2-carboxylic acid with 2.6 g. of paraformaldehyde and 5.3 g. of dimethylamine hydrochloride in 90 ml. of dioxane is obtained, analogously to example 1(a), the crude 7-methoxy-4-[2-(dimethylaminomethyl)-butyryl]-benzofuran-2-carboxylic acid hydrochloride, which can be converted with 7.0 g. of sodium acetate in 70 ml. of glacial acetic acid into the 7-methoxy-4-(2-methylene-butyryl)-benzofuran-2-carboxylic acid, m.p. 195° (from ethanol/water).

The 7-methoxy-4-butyryl-benzofuran-2-carboxylic acid, m.p. 224° (from ethyl acetate/benzene), which is used as the starting compound, is produced, analogously to example 1(b), from 15.0 g. of 7-methoxy-benzofuran-2-carboxylic acid [cp. R. Andrisano et al., Boll. sci.fac.chim.ind. 14, 96 (1956)] with 12.4 g. of butyryl chloride and 38.4 g. of aluminum chloride in 50 ml. of nitrobenzene.

EXAMPLE 4 a. From 10.0 g. of 6,7-dimethyl-4-butyryl-benzofuran-2-carboxylic acid with 1.64 g. of paraformaldehyde and 3.3 g. of dimethylamine hydrochloride is obtained, analogously to example 1(a), the crude 6,7-dimethyl-4-[2-(dimethylaminomethyl)-butyryl]-benzofuran-2-carboxylic acid hydrochloride, which is converted with 10.0 g. of sodium acetate and 100 ml. of glacial acetic acid into the 6,7-dimethyl-4-(2-methylene-butyryl)-benzofuran-2-carboxylic acid, m.p. 200°–202° from benzene/ethyl acetate).

The 6,7-dimethyl-4-butyrl-benzofuran-2-carboxylic acid, used as starting material, is produced as follow:

b. 45.0 c. of 2,3-dimethylphenol and 50.0 g. of malic acid are pulverized and well mixed together. One hundred milliliters of concentrated sulfuric acid are added to the mixture and the latter, while stirring, is slowly heated so that the reaction temperature is 130° after 30 minutes. The solution is maintained for a further 30 minutes at this temperature, then poured onto 1 kg. of ice and the obtained suspension is stirred for 30 minutes. The precipitated crystals are filtered with suction and recrystallized from ethanol. 7,8-dimethyl coumarin is obtained, m.p. 128°–130°.

c. 34.8 g. of the 7,8-dimethyl coumarin, obtained under (b), are dissolved in 60 ml. of chloroform. To this solution is added dropwise, while stirring and with occasional cooling with ice, a solution of 32.5 g. of bromine in 20 ml. of chloroform, so that the reaction temperature does not exceed 20°–25°. The mixture is stirred for a further 20 minutes at room temperature and, subsequently, the chloroform is completely evaporated off in vacuo. The residue is added in portions to a suspension of 90.0 g. of potassium hydroxide in 300 ml. of ethanol and the reaction temperature is maintained between 30° and 40° by ice cooling. The mixture is then stirred for 30 minutes at 40° and for 30 minutes at 80° and then poured onto 2 liters of ice water. The aqueous alkaline solution is washed twice using 400 ml. of ether each time and adjusted to pH 2–3 with concentrated hydrochloric acid. The obtained suspension is stirred for half an hour at room temperature. The precipitated crystals are filtered with suction and recrystallized from ethanol. The 6,7-diemthyl-benzofuran-2-carboxylic acid, m.p. 237°–239° is obtained.

d. From 23.0 g. of the carboxylic acid, obtained under (c), with 20.0 g. of butyryl chloride and 70.0 g. of aluminum chloride in 80 ml. of nitrobenzene is obtained, analogously to example 1(b), the 6,7-dimethyl-4-butyryl-benzofuran-2-carboxylic acid, m.p. 207°–208° (from ethanol).

EXAMPLE 5 a. From 5.0 g. of 6-ethyl-4-butyryl-benzofuran-2-carboxylic acid with 1.09 g. of paraformaldehyde and 2.10 g. of dimethylamine hydrochloride is obtained, analogously to example 1(a), the crude 6-ethyl- 4-[2-(dimethylaminomethyl)-butyryl]-benzofuran-2-carboxylic acid hydrochloride, which is converted with 5.0 g. of sodium acetate and 50 ml. of glacial acetic acid into the 6-ethyl-4-(2-methylene-butyryl)-benzofuran-2-carboxylic acid, m.p. 145°–146° (from benzene/ethyl acetate).

The 6-ethyl-4-butyryl-benzofuran-2-carboxylic acid, used as starting material, is produced as follows:

b. 50.0 g. of m-ethylphenol, 55.0 g. of malic acid and 100 ml. of concentrated sulfuric acid are slowly heated, while stirring, to 130° and then further stirred for 20 minutes at this temperature. The reaction mixture is then poured onto 2 kg. of ice and extracted with 500 ml. of ether. The ether extract is washed with 200 ml. of water and with 200 ml. of concentrated aqueous sodium hydrogen carbonate solution, dried over magnesium sulfate and concentrated by evaporation. The residue, i.e. the crude 7-ethyl coumarin, is used as crude product.

c. 30.4 g. of 7-ethyl coumarin are dissolved in 40 ml. chloroform and to the solution are added dropwise, while stirring, 29.0 g. of bromine in 20 ml. of chloroform. The temperature of the reaction mixture is maintained between 20° and 25° by occasional cooling with an ice bath. The reaction mixture is subsequently further stirred for 20 minutes at room temperature and concentrated by evaporation at 50° in the water-jet vacuum. The residue is added in portions to a solution of 80.0 g. of potassium hydroxide in 160 ml. of ethanol, which is heated to 30°, and the reaction temperature is maintained at 30°–40 by cooling. The reaction mixture is subsequently stirred for 30 minutes at room temperature and for 30 minutes at 80° and then poured onto 1 liter of ice water. The aqueous alkaline solution is washed twice with 300 ml. of ether each time, acidified with concentrated hydrochloric acid to obtain pH 2–3 and the precipitated crude product is filtered with suction. The crude product is recrystallized from ethanol and dried in vacuo at 80°, after which the obtained 6-ethyl-benzofuran-2-carboxylic acid melts at 152°–154°.

d. From 6-ethyl-benzofuran-2-carboxylic acid with butyric acid chloride and aluminum chloride in nitrobenzene is obtained, analogously to example 1(b), the 6-ethyl-4-butyryl-benzofuran-2-carboxylic acid, m.p. 197°–199° (from benzene/ethyl acetate), in addition to the 6-ethyl-5-butyryl-benzofuran-'-carboxylic acid, m.p. 152°–153°, from which the former is separated by fractional recrystallization from ethyl acetate.

EXAMPLE 6

From 6.5 g. of 5-methoxy-4-butyryl-benzofuran-2-carboxylic acid with 1.0 g. of paraformaldehyde and 2.5 g. of dimethylamine hydrochloride is obtained, analogously to example 1(a), the crude 5-methoxy-4-[2-(dimethylaminomethyl)-butyryl]-benzofuran-2-carboxylic acid hydrochloride, which is converted with 5.0 g. of sodium acetate in 50 ml. of glacial acetic acid into the 5-methoxy-4-(2 M.P.—methylene—butyryl)-benzofuran-2-carboxylic acid, 139°–141° (from benzene).

The 5-methoxy-4-butyryl-benzofuran-2-carboxylic acid, m.p. 202°–203° (from ethanol), used as starting material, is produced, analogously to example 1(b), from 20.0 g. of 5-methoxy-benzofuran-2-carboxylic acid [cp. S. Tanaka, J.Am.Chem.Soc. 73, 872 (1951)] with 17.0 g. of butyryl chloride and 40.0 g. of aluminum chloride in 75 ml. of nitrobenzene.

EXAMPLE 7

1.8 g. of 6-methyl-4-(3-methylbutyryl)-benzofuran-2-carboxylic acid with 0.7 g. of paraformaldehyde and 2.2 g. of dimethylamine hydrochloride are slurried in 10 ml. of methanol. The methanol is then distilled off under normal pressure and the reaction mixture is subsequently heated for 8 hours to 150°. The obtained melt, which consists of the crude 6-methyl-4-(3-methyl-2-dimethylaminomethylbutyryl)-benzofuran-2-carboxylic acid hydrochloride, is allowed to cool. 3.0 g. of anhydrous sodium acetate and 30 ml. of glacial acetic acid are then added and the obtained solution is refluxed, while stirring, for 2 hours. The glacial acetic acid is then distilled off, to the residue are added 50 ml. of water and the mixture is adjusted to 3 3 with concentrated hydrochloric acid. The mixture is further stirred to obtain complete crystallization, the crystals are filtered off with suction, washed with 50 ml. of water and dried in vacuo. The 6-methyl-4 -(2-methylene-3-methylbutyryl)-benzofuran-2-carboxylic acid, recrystallized from benzene, melts at 155°–156°.

The 6-methyl-4-(3-methylbutyryl)-benzofuran-2-carboxylic acid, used as starting material is produced analogously to example 1(b) from 6-methyl-benzofuran-2-carboxylic acid [cp. K. von Auwers, Ann.Chem. 408, 255 (1915)] with isovaleryl chloride and aluminum chloride in nitrobenzene. The crude product contains, in addition to the 6-methyl-4-(3-methylbutyryl)-benzofuran-2-carboxylic acid, m.p. 192°–193°, the 6-methyl-5-(3-methylbutyryl)-benzofuran-2-carboxylic acid, which are separated from each other by fractional crystallization from ethyl acetate.

EXAMPLE 8

From 2.0 g. of 6-methyl-4-propionyl-benzofuran-2-carboxylic acid with 0.6 g. of paraformaldehyde and 1.4 g. of dimethylamine hydrochloride is obtained, analogously to example 1(a) the crude 6-methyl-4-(2-dimethylaminomethyl-propionyl)-benzofuran-2-carboxylic acid hydrochloride, which is converted with sodium acetate in glacial acetic acid into the 6-methyl-4-(2-methylene-propionyl)-benzofuran-2-carboxylic acid, m.p. 182°–183° (from benzene).

The 6-methyl-4-propionyl-benzofuran-2-carboxylic acid is produced, analogously to example 1(b) from 6-methyl-benzofuran-2-carboxylic acid [cp. K. von Auwers, Ann.Chem. 408, 255 (1915)] with propionyl chloride and aluminum chloride in nitrobenzene. By means of fractional crystallization from dioxane/ethyl acetate is obtained the 6-methyl-4-propionyl-benzofuran-2-carboxylic acid, which melts at 231°–233°.

EXAMPLE 9

From 1.0 g. of 6-methyl-4-valeryl-benzofuran-2-carboxylic acid with 0.3 g. of paraformaldehyde and 0.8 g. of dimethylamine hydrochloride is obtained, analogously to example 1(a), the crude 6-methyl-4-(2-dimethylaminomethyl-valeryl)-benzofuran-2-carboxylic acid hydrochloride, which is converted with sodium acetate in glacial acetic acid into the 6-methyl-4-(2-methylene-valeryl)-benzofuran-2-carboxylic acid, m.p. 165°–166° (from benzene).

The 6-methyl-4-valeryl-benzofuran-2-carboxylic acid, used as starting material, is produced analogously to example 1(b), from 6-methyl-benzofuran-2-carboxylic acid [cp. K. von Auwers, Ann.Chem. 408, 255 (1915)] with valeryl chloride and aluminum chloride in nitrobenzene. The 6-methyl-4-valeryl-benzofuran-2-carboxylic acid, obtained by fractional crystallization from methylethyl ketone, melts at 193°–195°.

The following prescriptions further illustrate the production of tablets and dragées:

EXAMPLE 10

One thousand grams of 6-methyl-4-(2-methylene-butyryl)-benzofuran-2-carboxylic acid are mixed with 550 g. of lactose and 292 g. of potato starch. The mixture is moistened with an aqueous solution of 8 g. of gelatine and granulated through a sieve. After drying, 60 g. of potato starch, 60 g. of talcum, 10 g. of magnesium stearate and 20 g. of colloidal silicon dioxide are mixed in and the mixture is pressed into 10,000 tablets, each weighing 200 mg. and each containing 100 mg. of active substance. Optionally, the tablets can be provided with grooves for more accurate adjustment of the dosage amount.

EXAMPLE 11

A granulate is produced from 1,000 g. of 6,7-dimethyl-4-(2-methylene-butyryl)-benzofuran-2-carboxylic acid, 379 g. of lactose and the aqueous solution of 6 g. of gelatine. After drying, the granulate is mixed with 10 g. of colloidal silicon dioxide, 40 g. of talcum, 60 g. of potato starch and 5 g. of magnesium stearate and the obtained mixture is pressed into 10,000 dragée cores. These are subsequently coated with a concentrated syrup made from 533.5 g. of crystallized saccharose, 20 g. of shellac, 75 g. of gum arabic, 250 g. of talcum, 20 g. of colloidal silicon dioxide and 1.5 g. of dyestuff, and dried. The obtained dragées each weigh 240 mg. and each contain 100 mg. of active substance.

What is claimed is:

1. A compound of the formula

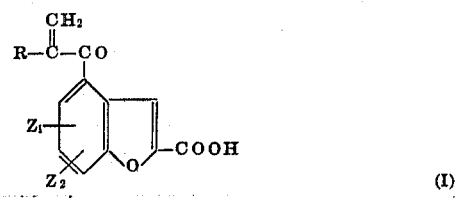

(I)

wherein

R is alkyl having at most three carbon atoms; and $Z_1$ and $Z_2$ independently of each other are hydrogen, methyl, ethyl, methoxy or ethoxy; and the pharmaceutically acceptable salts thereof with bases.

2. A compound according to claim 1, wherein R is ethyl.

3. A compound according to claim 1, which is 6-methyl-4-(2-methylene-butyryl)-benzofuran-2-carboxylic acid.

4. A compound according to claim 1, which is 6,7-dimethyl-4-(2-methylene-butyryl)-benzofuran-2-carboxylic acid.

* * * * *